United States Patent
Tian et al.

(10) Patent No.: US 9,369,702 B2
(45) Date of Patent: *Jun. 14, 2016

(54) CONTEXT ADAPTIVE POSITION AND AMPLITUDE CODING OF COEFFICIENTS FOR VIDEO

(71) Applicant: Cisco Technology Inc., San Jose, CA (US)

(72) Inventors: Dihong Tian, San Jose, CA (US); Wen-hsiung Chen, Sunnyvale, CA (US); Pi Sheng Chang, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 23 days.

This patent is subject to a terminal disclaimer.

(21) Appl. No.: 14/185,403

(22) Filed: Feb. 20, 2014

(65) Prior Publication Data

US 2014/0169453 A1 Jun. 19, 2014

Related U.S. Application Data

(63) Continuation of application No. 13/603,320, filed on Sep. 4, 2012, now Pat. No. 8,670,485.

(51) Int. Cl.
| | |
|---|---|
| *H04B 1/66* | (2006.01) |
| *H04J 13/00* | (2011.01) |
| *H04N 19/124* | (2014.01) |
| *H04N 19/176* | (2014.01) |
| *H04N 19/196* | (2014.01) |
| *H04N 19/13* | (2014.01) |
| *H04N 19/60* | (2014.01) |
| *H04N 19/167* | (2014.01) |

(52) U.S. Cl.
CPC ......... *H04N 19/0009* (2013.01); *H04N 19/124* (2014.11); *H04N 19/13* (2014.11); *H04N 19/167* (2014.11); *H04N 19/176* (2014.11); *H04N 19/196* (2014.11); *H04N 19/60* (2014.11)

(58) Field of Classification Search
CPC .................................. H04B 1/66; H04J 13/00
USPC ............. 375/240.23, 240.22, 240.03, 240.24, 375/240.26, 316, 324, 340, 341, 265, 262, 375/253, 240.1, 246
See application file for complete search history.

(56) References Cited

U.S. PATENT DOCUMENTS 8,265,162 B2 * 9/2012 Tian et al. ................ 375/240.23
8,670,485 B2 * 3/2014 Tian et al. ................ 375/240.24

* cited by examiner

Primary Examiner — Hanh N Nguyen

(57) ABSTRACT

A coding method, apparatus, and medium with software encoded thereon to implement a coding method. The coding method includes encoding the position of non-zero-valued coefficients in an ordered series of quantized transform coefficients of a block of image data, including encoding events using variable length coding using a plurality of variable length code mappings that each maps events to codewords, the position encoding including switching between the code mappings based on the context. The coding method further includes encoding amplitudes of the non-zero-valued coefficients using variable dimensional amplitude coding in the reverse order of the original ordering of the series.

18 Claims, 5 Drawing Sheets

| Table 1: An example of context-based VLC table selection for position coding |||||||
|---|---|---|---|---|---|---|
| | Present frequency index ||||||
| | 0 | 1~$I_1$ | $I_1$~$I_2$ | $I_2$~$I_3$ | $I_3$~$I_4$ | $I_4$~63 |
| Previous maximum Run_z  0 | 0 | $VLC_p0$ | $VLC_p0$ | $VLC_p1$ | $VLC_p1$ | $VLC_p2$ | $VLC_p2$ |
| $R_1$ | – | $VLC_p1$ | $VLC_p1$ | $VLC_p2$ | $VLC_p2$ | $VLC_p3$ |
| $R_2$ | – | $VLC_p1$ | $VLC_p2$ | $VLC_p3$ | $VLC_p3$ | $VLC_p4$ |
| $R_3$ | – | – | $VLC_p2$ | $VLC_p3$ | $VLC_p4$ | $VLC_p4$ |
| . . . | . . . | . . . | . . . | . . . | . . . | . . . |

FIG. 2

CONTEXT ADAPTIVE POSITION AND AMPLITUDE CODING OF COEFFICIENTS FOR VIDEO

RELATED APPLICATIONS

The present application is a continuation of U.S. patent application Ser. No. 13/603,320, filed Sep. 4, 2012, which is a continuation of U.S. patent application Ser. No. 12/016,441, filed Jan. 18, 2008. U.S. patent application Ser. No. 12/016,441 claims priority of and is a conversion of U.S. Provisional Patent Application No. 60/976,742, filed Oct. 1, 2007. The entire contents of U.S. Provisional Patent Application No. 60/976,742 and U.S. patent application Ser. Nos. 12/016,441 and 13/603,320 are incorporated by reference herein.

TECHNICAL FIELD

The present disclosure relates generally to image and video compression.

BACKGROUND

Transform coding and decoding of video data usually includes what is called entropy coding. For compression, the pixel information of a picture, e.g., a residual picture after motion compensated prediction, or of a picture for intra-coding is divided into blocks. The blocks are transformed, e.g., by a discrete cosine transform (DCT) or a similar transform, and the resulting transform coefficients are quantized. The quantized transform coefficients are ordered, e.g., from low to higher frequencies along a path in the two dimensional transform domain. The ordered series of quantized transform coefficients is then losslessly encoded by an entropy coding method. One popular entropy coding method is variable length coding in which one or more events, representing one or more quantized coefficients of properties thereof, are encoded by codewords such that events that are more likely-to-occur are encoded on average by codewords that are shorter than are events that are less likely-to-occur. Variable length coding (VLC), due to its nice tradeoff in efficiency and simplicity, has been widely used in entropy coding, particularly when the codec is desired to have low computational complexity.

Recent video coder/decoders (codecs) such as those conforming to H.264/AVC and China's AVS standard (Audio Video Coding Standard of China), take into account the context of transform blocks to reduce inter-coefficient redundancy. H.264/AVC describes a method called context-based adaptive variable length coding (CAVLC), while China's AVS describes context-based 2D variable length coding (C2DVLC). Each of these uses multiple VLC tables and performs context-based adaptive table switching while coding the coefficients of a block.

BRIEF DESCRIPTION OF THE DRAWINGS

FIG. 2 shows a table illustrating by way of example how in one embodiment a VLC table is selected based upon the previous maximum run of zero-valued quantized coefficients preceding a non-zero-value, and the present frequency index.

DESCRIPTION

Overview

Figure 1:
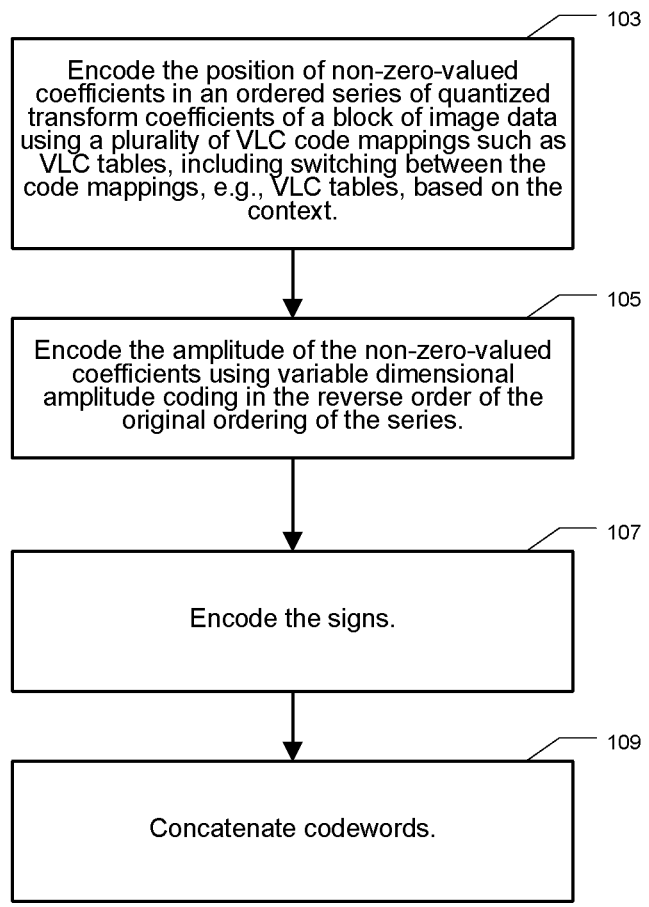
FIG. 1 shows a flowchart of one embodiment of a context-adaptive position and amplitude coding (CAPAC) method for coding an ordered sequence of quantized transform coefficients.

Embodiments of the present invention include a coding method, an apparatus for coding, and logic encoded in one or more computer-readable tangible mediums to carry out a coding method. The coding method is to code an ordered series of quantized transform coefficients of a block of image data, in particular, an advanced VLC-based entropy coding method. Other embodiments include a decoding method of decoding a set of codewords that are encoded using the coding method, an apparatus for decoding a set of codewords that are encoded using the coding method, and logic encoded in one or more computer-readable tangible mediums to carry out a decoding method.

Particular embodiments include a coding method comprising: for an ordered series of quantized transform coefficients of a block of image data, the quantized transform coefficients of the series having a most likely-to-occur amplitude, and at least one other amplitude including a next-to-most likely-to-occur amplitude, encoding the position of coefficients having other than the most likely-to-occur amplitude. The position encoding includes encoding events using variable length coding such that on average, events that are more likely to occur are encoded by respective codewords that are shorter than the respective codewords for events that are less likely to occur. The variable length coding uses a plurality of variable length code mappings that each maps events to codewords. The position encoding includes switching between the code mappings based on the context. In one embodiment, the context for includes one or more parameters that are known or derivable from one or more previously encoded events.

The method further includes encoding amplitudes of the coefficients having values other than the most likely-to-occur amplitude using variable dimensional amplitude coding in the reverse order of the original ordering of the series, such that relatively more likely-to-occur sequences of quantized coefficients are represented by relatively short sets of codewords and relatively less likely-to-occur sequences of quantized coefficients are represented by relatively long sets of codewords. In one embodiment, such variable dimensional amplitude coding uses a plurality of variable length code mappings that each maps events to codewords, and includes switching between the code mappings based on the context. In one embodiment, the context for includes one or more parameters that are known or derivable from one or more previously encoded events.

Particular embodiments include a computer-readable medium encoded with computer-executable instructions that when executed by one or more processors of a processing system implement a coding method comprising: for an ordered series of quantized transform coefficients of a block of image data, the series having a most likely-to-occur amplitude, and at least one other amplitude including a next-to-most likely-to-occur amplitude, encoding the position of coefficients having other than the most likely-to-occur amplitude. The position encoding includes encoding events using variable length coding such that on average, events that are more likely to occur are encoded by respective codewords that are shorter than the respective codewords for events that are less likely to occur. The variable length coding uses a plurality of variable length code mappings that each maps events to codewords. The position encoding includes switching between the code mappings based on the context. In one embodiment, the context for includes one or more parameters that are known or derivable from one or more previously encoded events. The method implemented as a result of executing further includes encoding amplitudes of the coefficients having values other than the most likely-to-occur amplitude using variable dimensional amplitude coding in the reverse order of the original ordering of the series, such that relatively more likely-to-occur sequences of quantized coefficients are represented by relatively short sets of codewords and relatively less likely-to-occur sequences of quantized coefficients are represented by relatively long sets of codewords. In one embodiment, such variable dimensional amplitude coding uses a plurality of variable length code mappings that each maps events to codewords, and includes switching between the code mappings based on the context. In one embodiment, the context for includes one or more parameters that are known or derivable from one or more previously encoded events.

Particular embodiments include an apparatus comprising: a Context Adaptive Position and Amplitude Coding (CAPAC) variable length encoder operative to encode an ordered sequence of quantized transform coefficients of a block of image data, the sequence having a most likely-to-occur amplitude, and at least one other amplitude including a next-to-most likely-to-occur amplitude. The CAPAC variable length encoder includes a position encoder operative to encode the position of coefficients having other than the most likely-to-occur amplitude, the position encoder operative to encode events using variable length coding such that on average, events that are more likely to occur are encoded by respective codewords that are shorter than the respective codewords for events that are less likely to occur. The variable length coding uses a plurality of variable length code mappings that each maps events to codewords. The position encoding includes switching between the code mappings based on the context. In one embodiment, the context for includes one or more parameters that are known or derivable from one or more previously encoded events. The CAPAC variable length encoder further includes an amplitude encoder operative to encode amplitudes of the coefficients having values other than the most likely-to-occur amplitude using variable dimensional amplitude coding in the reverse order of the original ordering of the series, such that relatively more likely-to-occur sequences of quantized coefficients are represented by relatively short sets of codewords and relatively less likely-to-occur sequences of quantized coefficients are represented by relatively long sets of codewords. In one embodiment, such variable dimensional amplitude coding by the amplitude coder uses a plurality of variable length code mappings that each maps events to codewords, and includes switching between the code mappings based on the context. In one embodiment, the context for includes one or more parameters that are known or derivable from one or more previously encoded events.

Particular embodiments include a decoding method comprising recognizing codewords in a set of concatenated codewords, the codewords formed by a coding method, and decoding the recognized codewords using a plurality of code mappings. The coding method includes: for an ordered series of quantized transform coefficients of a block of image data, the series having a most likely-to-occur amplitude, and at least one other amplitude including a next-to-most likely-to-occur amplitude, encoding the position of coefficients having other than the most likely-to-occur amplitude. The position encoding includes encoding events using variable length coding such that on average, events that are more likely to occur are encoded by respective codewords that are shorter than the respective codewords for events that are less likely to occur. The variable length coding uses a plurality of variable length code mappings that each maps events to codewords. The position encoding includes switching between the code mappings based on the context. In one embodiment, the context for includes one or more parameters that are known or derivable from one or more previously encoded events. The coding method further includes encoding amplitudes of the coefficients having values other than the most likely-to-occur amplitude using variable dimensional amplitude coding in the reverse order of the original ordering of the series, such that relatively more likely-to-occur sequences of quantized coefficients are represented by relatively short sets of codewords and relatively less likely-to-occur sequences of quantized coefficients are represented by relatively long sets of codewords. In one embodiment, such variable dimensional amplitude coding uses a plurality of variable length code mappings that each maps events to codewords, and includes switching between the code mappings based on the context. In one embodiment, the context for includes one or more parameters that are known or derivable from one or more previously encoded events.

Particular embodiments include a computer-readable medium encoded with computer-executable instructions that when executed by one or more processors of a processing system implement a decoding method comprising: recognizing codewords in a set of concatenated codewords, the codewords formed by a coding method; and decoding the recognized codewords using a plurality of code mappings. The coding method includes: for an ordered series of quantized transform coefficients of a block of image data, the series having a most likely-to-occur amplitude, and at least one other amplitude including a next-to-most likely-to-occur amplitude, encoding the position of coefficients having other than the most likely-to-occur amplitude. The position encoding includes encoding events using variable length coding such that on average, events that are more likely to occur are encoded by respective codewords that are shorter than the respective codewords for events that are less likely to occur. The variable length coding uses a plurality of variable length code mappings that each maps events to codewords. The position encoding includes switching between the code mappings based on the context. In one embodiment, the context for includes one or more parameters that are known or derivable from one or more previously encoded events. The coding method further includes encoding amplitudes of the coefficients having values other than the most likely-to-occur amplitude using variable dimensional amplitude coding in the reverse order of the original ordering of the series, such that relatively more likely-to-occur sequences of quantized coefficients are represented by relatively short sets of codewords and relatively less likely-to-occur sequences of quantized coefficients are represented by relatively long sets of codewords. In one embodiment, such variable dimensional amplitude coding uses a plurality of variable length code mappings that each maps events to codewords, and includes switching between the code mappings based on the context. In one embodiment, the context for includes one or more parameters that are known or derivable from one or more previously encoded events.

Particular embodiments include an apparatus for decoding comprising: a codeword recognizer operative to recognize codewords in a set of concatenated codewords, the codewords formed by a coding method; and a codeword decoder operative to decode the recognized codewords, the codeword decoder using a set of code mappings. The coding method includes: for an ordered series of quantized transform coefficients of a block of image data, the series having a most likely-to-occur amplitude, and at least one other amplitude including a next-to-most likely-to-occur amplitude, encoding the position of coefficients having other than the most likely-to-occur amplitude. The position encoding includes encoding events using variable length coding such that on average, events that are more likely to occur are encoded by respective codewords that are shorter than the respective codewords for events that are less likely to occur. The variable length coding uses a plurality of variable length code mappings that each maps events to codewords. The position encoding includes switching between the code mappings based on the context. In one embodiment, the context for includes one or more parameters that are known or derivable from one or more previously encoded events. The coding method further includes encoding amplitudes of the coefficients having values other than the most likely-to-occur amplitude using variable dimensional amplitude coding in the reverse order of the original ordering of the series, such that relatively more likely-to-occur sequences of quantized coefficients are represented by relatively short sets of codewords and relatively less likely-to-occur sequences of quantized coefficients are represented by relatively long sets of codewords. In one embodiment, such variable dimensional amplitude coding uses a plurality of variable length code mappings that each maps events to codewords, and includes switching between the code mappings based on the context. In one embodiment, the context for includes one or more parameters that are known or derivable from one or more previously encoded events.

Particular embodiments may provide all, some, or none of the aspects, features, or advantages described herein. Particular embodiments may provide one or more other aspects, features, or advantages, one or more of which may be readily apparent to a person skilled in the art from the figures, descriptions, and claims herein.

Example Embodiment(s)

Variable length coding includes encoding events using codewords such that on average, events that are more likely to occur are encoded by respective codewords that are shorter than the respective codewords for events that are less likely to occur. The lookup of codewords uses one or more code mappings that map events to the codewords. In the embodiments described herein, the mappings of events to codewords are represented by coding tables, e.g., VLC tables to look up the codeword for a particular event to encode. However, those in the art will understand that a table is only one data structure that can be used to maintain the codewords for a lookup. Therefore, by "table" is meant any data structure for storing the codewords such that an event, e.g., a value or set of values, can be looked up.

Those in the art will also understand that the VLC tables to be used are determined according to statistics of the events. In different versions, the statistics may be assumed statistics based on measurements of similar pictures or sequences of pictures, or may be based on statistics gathered on the actual picture. Furthermore, those in the art will understand that VLC tables need not include only variable length codes. In order to reduce the size of any particular table, those events that are relatively rare might be encoded by a fixed length rather than variable length code.

Consider the ordered series of quantized transform coefficients. Usually zero is the most likely to occur coefficient amplitude, and 1 is the next most-likely-to-occur amplitude. By Level is defined to mean the amplitude of the quantized transform coefficients. Denote by Run the run-length of a run of consecutive zero-valued coefficients, e.g., that precede a cluster of non-zero-valued coefficients, where Run>0. It has been observed that, statistically, as the transform frequency or frequency range increases, the magnitude of nonzero-valued coefficient (denoted Level herein) becomes smaller while the run-length of successive zero-valued coefficients (called Run) becomes larger. That is, lower frequencies are more likely to have higher valued quantized coefficients, while higher frequencies are likely to have longer runs of consecutive zero-valued coefficients than would lower frequencies, with some non-zero-valued coefficients scattered between these runs. The newest video codecs, H.264/AVC and China's AVS (Audio Video Coding Standard of China), take into account the context of transform blocks to reduce inter-coefficient redundancy. H.264/AVC describes a method called context-based adaptive variable length coding (CAVLC), while China's AVS describes context-based 2D variable length coding (C2DVLC). Each of these uses multiple VLC tables and performs context-based adaptive table switching while coding the coefficients of a block.

For more information on CABAC, see D. Marpe, H. Schwarz, and T. Wiegand, "Context-Based Adaptive Binary Arithmetic Coding in the H.264/AVC Video Compression Standard," IEEE Trans. Circuits Syst. Video Technol., vol. 13, pp. 620-636, July 2003. For more information on AVS, see http://www.avs.org.cn/en/. For C2DVLC see Qiang Wang; Debin Zhao; Siwei Ma; Yan Lu; Qingming Huang; Wen Gao: "Context-based 2D-VLC for video coding," Proceedings of 2004 IEEE International Conference on Multimedia, ICME 04, Vol. 1, June 2004, pages 89-92.

Hybrid variable length coding (HVLC), for example as described in U.S. Patent Application Publication No. US 20050276487 and International Patent Application Publication No. WO 2006/001994, explores the context of a transform block in a different and relatively simpler way. HVLC takes advantage of the observation that clusters of non-zero-valued coefficients are more likely to occur in a lower frequency region, while non-zero-valued coefficients are more likely to be scattered at higher frequencies. HVLC includes partitioning the series into a first region, e.g., a low-frequency region where clusters are more likely to appear and a second region, e.g., a high frequency region where the non-zero-valued coefficients are likely to be scattered. HVLC includes encoding coefficients in the two frequency regions differently by at least two VLC methods. The reader is directed to US 20050276487 and WO 2006/001994, and the contents of such US 20050276487 and WO 2006/001994 are incorporated herein by reference The inventors believe that some of the VLC methods described in H.264/AVC, China's AVS, and in HVLC and its variations can still be improved upon.

CAVLC as described in H.264/AVC was specifically designed for coding 4×4 transform blocks. For high fidelity video, a larger transform size (8×8) is preferable for better preserving fine details and textures. When applied to 8×8 transform, as specified in H.264 High Profile, CAVLC regroups the 64 coefficients into four 4×4 blocks and codes them separately, which may lead to inefficiencies.

C2DVLC as described in China's AVS preserves the conventional run-level VLC and was designed with 8×8 as the targeted transform size. However, C2DVLC solely uses the maximum of previously coded Levels to model local context, without consideration on the position part. In other words, it does not take into account information on the relative frequency of the coefficient—the "where we are" information—during coding.

HVLC partitions each ordered coefficient series of a transform block into two frequency regions, either by a fixed breakpoint or by a variable one, and encodes the resulting two ordered series separately by two sets of one or more VLC tables.

There is a need in the art for methods that might improve coding efficiency by accounting for the present frequency information—the "where we are" information. While hybrid methods use (at least) two different VLC methods to respectively code low-frequency and high-frequency coefficients, each scheme might use only one VLC table. Thus, one might view partitioning the ordered series of quantized coefficient into two portions and coding them separately as equivalent to the use of two VLC tables. Intuitively, this might not be as efficient as using multiple VLC tables and performing context-based adaptive table switching to switch between the multiple tables.

The above intuition and observation of the aforementioned possible deficiencies inspired the present invention, in which we propose a new context adaptive VLC coding method (and related apparatuses, software, and decoding method) to improve the coding efficiency of coding 8×8 transform blocks while maintaining relatively low computation complexity. The proposed coding scheme takes into account the relative frequency of the coefficient(s) being coded—the "where we are" information by performing separate, two-way position and amplitude coding processes and using multiple code mappings, e.g., code tables and context-based table switch in both the coding processes. In addition, the local variation of the amplitudes is modelled by regrouping the Level series into three sub-series and coding them with different dimensional VLC.

The coding method embodiments described herein are for coding a block of image data. The block of image data is transformed, the transform coefficients are quantized, and the resulting quantized coefficients arranged as two-dimensional array are ordered, e.g., along a zig-zag path on the two-dimensional array in order of increasing spatial frequency, to result in an ordered series of quantized transform coefficients. The transform and quantizing are such that zero is the most likely-to-occur amplitude and 1 is next-most likely-to-occur amplitude. Note that those in the art will understand that the quantization and/or transforms can be changed such that other values are the most and next most-likely-to-occur amplitudes, and that the methods described herein can then be modified to accommodate such other quantization and/or transforms. Therefore, the assumption that zero is the most likely-to-occur amplitude and 1 is next-most likely-to-occur amplitude does not reduce the generality of the methods described. In general, the methods are applicable to an ordered series of quantized transform coefficients in which the quantized transform coefficients of the series have a most likely-to-occur amplitude, and at least one other amplitude including a next-to-most likely-to-occur amplitude.

One coding method embodiment includes the following four features: 1) separate, two-way coding of position and amplitude; 2) multiple VLC mappings, e.g., VLC tables with context-based adaptive code map switching, e.g., table switching; 3) one-dimensional or two-dimensional VLC for position coding in the forward direction in the ordering of the series of quantized coefficients, e.g., the normal zigzag scan order; and 4) variable dimensional amplitude coding in the reverse order to the original, e.g., in reverse to the zig-zag ordering of the quantized transform coefficients. This context-based adaptive two-way position and amplitude coding is referred to herein as Context Adaptive Position and Amplitude Coding (CAPAC).

One property of CAPAC lies in combining the aforementioned four techniques, each of which is now described in more detail.

FIG. 1 shows a flowchart of one method embodiment of CAPAC. The method includes in 103 encoding the position of non-zero-valued coefficients in an ordered series of quantized transform coefficients of a block of image data using a plurality of VLC code mappings such as VLC tables, including switching between the code mappings, e.g., VLC tables, based on the context. The method further includes in 105 encoding the amplitudes of the non-zero-valued coefficients using variable dimensional amplitude coding in the reverse order of the original ordering of the series. The method further includes in 107 encoding the signs of the non-zero-valued coefficients. The encodings produce codewords. One embodiment further includes in 109 concatenating the codewords.

The context for position encoding includes one or more parameters that are derivable from one or more previously encoded events, e.g., position events or amplitudes, such that an encoding process coding a current event, e.g., position event or amplitude(s), can derive the context at the time of encoding the current event.

In one embodiment, the one or more parameters of the context include the maximum run-length of the most likely-to-occur amplitude. In one embodiment, the one or more parameters of the context also or instead include the most recent run-length of the other than the most likely-to-occur amplitude. In one embodiment, the one or more parameters of the context also or instead include the relative frequency of the coefficients being coded, e.g., the total number of coefficients that have been encoded indicative of the relative frequency of the coefficients being coded.

In one embodiment, the variable dimensional amplitude coding uses a plurality of variable length code mappings that each maps events to codewords, and includes switching between the code mappings based on the context. In one embodiment, the one or more parameters of the context on which the switching of code mappings is based include the maximum previously encoded amplitude.

Position Coding

In one embodiment, starting with an ordered series of quantized transform coefficients of a block of image data, the coding of the positions of all nonzero-valued coefficients is performed prior to the coding of any magnitude. On the decoder side, the decoding of positions will indicate whether a coefficient has a zero or nonzero magnitude, e.g., a magnitude≥1.

In alternate embodiments, two alternative approaches can be used for position coding: one-dimensional (1D) and two-dimensional (2D) position coding. One 1D position coding embodiment follows the convention of coding the position of each nonzero-valued coefficient according to the number of consecutive zero-valued coefficients that precede the non-zero-valued coefficient, such a number possibly 0. This parameter is denoted Run_z herein. For one 2D position coding embodiment, the run-length of consecutive zero-valued coefficients, denoted Run_z, that precede a cluster of consecutive nonzero-valued coefficients and the run-length of the cluster of consecutive nonzero-valued coefficients—denoted Run_nz—are coded as a pair using a two-dimensional VLC method, e.g., using a two-dimensional VLC table, with Run_z≥0 and Run_z≥1. For both 1D and 2D position coding schemes, the following describe what context is used to predict the probability distribution of coefficient positions, design multiple VLC tables, and perform context-based adaptive table switch, and how.

One-Dimensional Position Coding

In one embodiment using one-dimensional position coding, two components that relate to context information are included. In one embodiment, one included context component is the maximum run, Run_z, of previously coded coefficients. Suppose the range of spatial frequencies of the transform is broken up into frequency sub-bands. In one embodiment, another included context component is an index indicative of the present frequency—in the form of a present frequency sub-band index. This indicates "where we are" during the position coding process. Combining these two context components provides a prediction of the variation tendency of the coefficient positions. One embodiment of the coding method ascertains whether or not to switch the VLC table based on such prediction.

FIG. 2 shows Table 1 that illustrates by way of example, how in one embodiment a VLC table is selected based upon the previous maximum run of zero-valued quantized coefficients preceding a non-zero-value (Run_z) and the present frequency index components. In FIG. 2, VLCpk, k=0, 1, 2, . . . denotes a particular VLC table for position coding and Ix, Ry denote the respective selected thresholds for the frequency index and previous maximum Run_z, respectively. Each VLCp table is a one-dimensional code mapping, e.g., code table in which each value of Run is assigned a variable length codeword.

Example Series

Consider as an example, the ordered series of quantized transform coefficients:

9 5 3 0 1 3 0 0 1 0 1 0 0 0 0 0 1 0 0 0 1 0 . . . .

The above-described 1D position coding method, using Table 1, codes the coefficient positions as the following Run_z series:

0, 0, 0, 1, |0, 2, |1, 5, |3, . . .

where '|' indicates a context-based table switch.

Two-Dimensional Position Coding

In contrast to 1D position coding, 2D position coding includes coding the coefficient positions in (Run_z, Run_nz) pairs. For example, for the above example ordered series, the following are the events of the series:

```
9 5 3
0 1 3
0 0 1
0 1
0 0 0 0 0 1
0 0 0 1 ...
``` and the following are representations of the two dimensional events that correspond to the coefficient positions of the example sequence:

(0, 3), (1, 2), (2, 1), (1, 1), (5, 1), (3, 1) . . . .

Since a run of consecutive nonzero-valued coefficients has already implied that the following coefficient has a zero magnitude, in one embodiment, each position event that includes a cluster of nonzero-valued coefficients includes the immediately following zero-valued quantized coefficient, such that the value of next Run_z is reduced by 1. This reduces coding redundancy. Thus, according to one embodiment, the modified events of clusters of non-zero-valued coefficients of the example sequence are as follows:

```
9 5 3 0
1 3 0
0 1 0
1 0
0 0 0 0 1 0
0 0 1 0 ...
``` and these are coded by the following 2D representations of positions of the events:

(0, 3), (0, 2), (1, 1), (0, 1), (4, 1), (2, 1) . . .

Using 2D VLC for coefficient positions is motivated by the observation that in typical sequence there is correlation between the run-length of zero-valued coefficients and the run-length of nonzero-valued coefficients. In particular, a small run of zero-valued coefficients in the low-frequency region is more likely to be followed by a run of nonzero-valued coefficients than in the high-frequency region. The inventors have observed that as either the run-length of zero-valued coefficients or the frequency sub-band index increases, the probability that the run of zero-valued coefficients is followed by a run of nonzero-valued coefficients decreases. Taking this context into account, the VLCp tables for low-frequency coefficients preceded by a small value of maximum Run_z (the upper left corner in Table 1 of FIG. 2) may be designed as 2D tables in which both Run_z and Run_nz have variable values. As the frequency index or the value of previous maximum Run_z increases, the variation of the second dimension, i.e., Run_nz, will diminish. As a result, the 2D VLCp table gradually merges to 1D VLCp table.

To predict the decreasing tendency of the run-length of nonzero-valued coefficients, another context parameter may be included in designing the position-coding VLC tables—the VLCp tables. The additional parameter is the most recent run-length of consecutive nonzero-valued coefficients. Thus, in one embodiment, selecting the VLCp table is based on three parameters: the previous maximum Run_z, the most recent Run_nz, and the present frequency index. The three parameters form what we call "extended context." Using the extended context may improve the efficiency of position coding, possibly at the cost of increased complexity of the coding process. In practice, which method to use for position coding would depend on the particular application at hand. For example, when speed and low-complexity is important, the simpler-to-implement method would be used, while when processing power is available, or when performance is relatively important, using the extended context would be used.

Amplitude Coding

In one embodiment of C2DVLC, the increasing tendency of Level is predicted by the maximum magnitude of previously coded coefficients. In practice, however, we have observed that a Level sequence is not monotonically increasing in the reverse scan order and typically shows local vibration. For instance, a nonzero-valued coefficient preceding or following a zero-valued coefficient is more likely to have a small magnitude, while a nonzero-valued coefficient that is preceded and followed by a nonzero-valued coefficient is more likely to have a larger magnitude. Such local context is not modelled in C2DVLC or other known entropy coding schemes.

In one embodiment of CAPAC, use is made of the fact that after the positions of all coefficients are coded, the distribution of nonzero-valued coefficients in the coefficient series is known. This knowledge provides context information for coding the amplitudes (Levels) of the nonzero-valued coefficients. To use this context, Levels are divided into three categories: If a nonzero-valued coefficient is preceded and followed by zero-valued coefficients or preceded by a zero and the final coefficient, it is categorized as what we call an "isolated" Level; if a nonzero-valued coefficient is preceded or followed by a zero-valued coefficient but not both, it is categorized as what we call an "adjacent-to-0" Level. The third category is neither an isolated Level or an adjacent-to-0 Level. The inventors noticed that in many ordered series, an isolated or adjacent-to-0 Level is more likely to have a small magnitude, while a nonzero-valued coefficient that is preceded and is followed by a nonzero-valued coefficient is more likely to have a larger magnitude.

Corresponding to the three categories, one embodiment of Level coding in CAPAC includes three phases. In the first phase, all isolated Levels are extracted and concatenated. Following the reverse scan order, the concatenated Level series is coded by a 3D VLC method in which every consecutive three Levels is coded as a 3-tuple using one codeword. The remaining one or two isolated Levels are coded in a second phase, together with all adjacent-to-0 Levels and following the reverse order of the series to the original increasing frequency, e.g., zig-zag ordering. In such a phase, every consecutive two Levels is coded using a 2D VLC method, and, if there exists any last (one) Level, such a last Level is coded in the third phase together with all the remaining Levels, using a 1D VLC method. Within each phase, multiple VLC tables are used, and the determination of a particular VLC is in one embodiment based on the maximum magnitude of those Levels that have higher frequency indices and that have been previously coded.

Consider again the example series:
9 5 3 0 1 3 0 0 1 0 1 0 0 0 0 0 1 0 0 0 1.

After position coding, in this case, there are (and would be known to the coding method) four isolated Levels (including the last "1"), three adjacent-to-0 Levels, and two remaining levels. The first-phase Level coding codes the first three isolated Levels as (1, 1, 1) by a 3D VLC table. In the second phase, the remaining isolated Level and the three adjacent-to-0 Levels are concatenated and are coded as two events: (1, 3) and (1, 3). Note that, although the two events have the same values, the VLC tables for coding these two events may be different depending on the context. In one embodiment, the first VLC table (initial table) is chosen based on the maximum Level of 1, while the second VLC table is determined by the maximum Level of 3. In the final phase, the last two Levels, 5 and 9, are coded by 1D VLC method with one or two VLC tables, depending on the context. The initial VLC table is determined by the maximum Level of 3 and then a table switch is determined based on the new maximum Level 5.

It should be noted that the coding method described above that uses three-phases is provided solely as an example of the Level coding process in one embodiment of CAPAC. It should by no means be considered to limit the scope of the present invention. The essence of amplitude coding in embodiments of the present invention includes taking into account not only the previously coded Levels (as do some known coding methods) but also the coefficients' frequency positions and their neighboring context, e.g., adjacency to 0, and code the Levels using multiple VLC tables.

Decoding

While the above descriptions were mostly of coding methods, those in the art will understand that the present description also leads to decoding methods and apparatuses that decode a bitstream that was coded by any of the coding embodiments described herein. The decoding method includes accepting a bitstream including codewords encoded by the coding method described above, including recognizing codewords in the bitstream and decoding the codewords.

Apparatuses

Particular embodiments include an apparatus comprising: a Context Adaptive Position and Amplitude Coding (CAPAC) encoder operative to encode an ordered series of quantized transform coefficients of a block of image data, the sequence having a most likely-to-occur amplitude, e.g., 0, and at least one other amplitude including a next-to-most likely-to-occur amplitude, e.g., 1, the CAPAC) encoder including a context adaptive position encoder operative to encode the positions of the coefficients having a value other than the most likely-to-occur amplitude in the series, and a context adaptive amplitude encoder operative to encode the amplitudes of the coefficients having a value other than the most likely-to-occur amplitude in the series. The position and amplitude encoders are operative to implement the position and amplitude coding methods are as described above.

Figure 3:
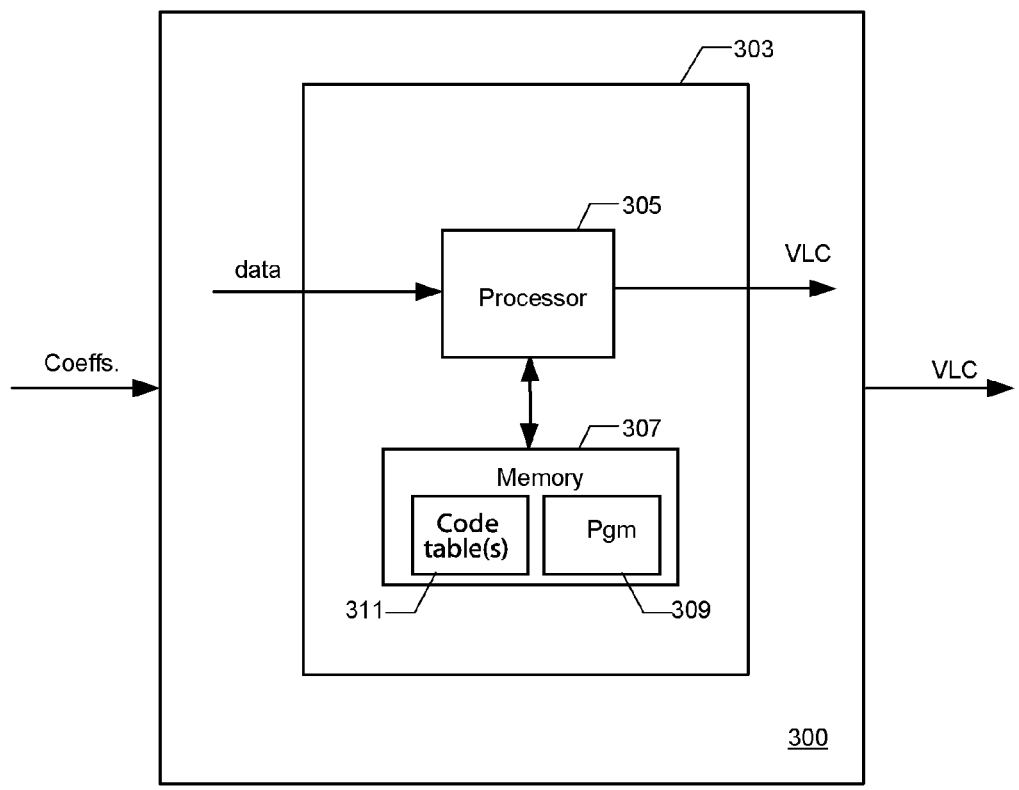
FIG. 3 shows an embodiment that includes an apparatus that is operable to implement a CAPAC coding method embodiment.

FIG. 3 shows embodiment that includes an apparatus 300 that is operable to implement a coding method as described herein, e.g., as described in FIG. 1. Apparatus 300 includes processing system 303 that includes one or more processors 305 and a memory 307. A single processor is shown in FIG. 3 and those in the art will appreciate that this may represent several processors. Similarly, a single memory subsystem 307 is shown, and those in the art will appreciate that the memory subsystem may include different elements such as RAM, ROM, and so forth. In addition, the memory subsystem is meant to include any non-volatile memory storage such as a magnetic or optical storage component. A computer program 309 is included and is loaded into the memory 307. Note that at any time, some of the programs may be in the different parts of the memory subsystem, as will be understood by those in the art. The program 309 includes instructions to instruct the processor to implement, in different versions, the different coding methods including the different position coding methods. In the embodiment shown, the method uses one or more coding tables 311 in the memory subsystem 307.

Figure 4:
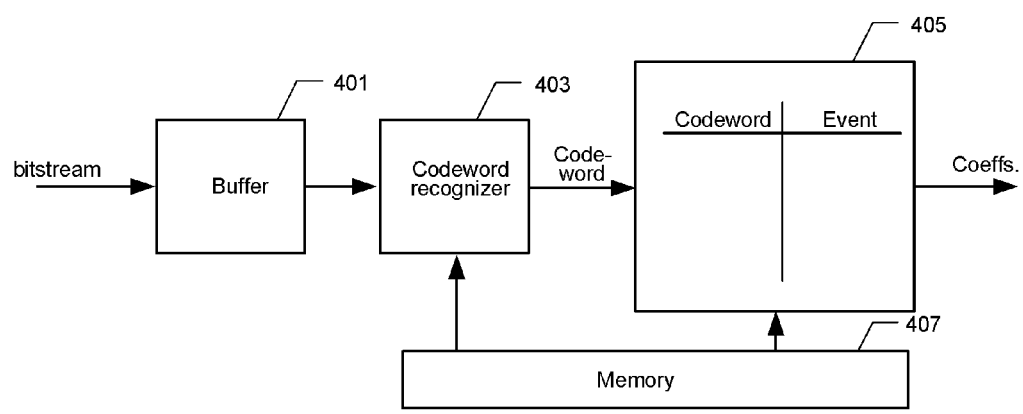
FIG. 4 shows one embodiment of a decoder.

FIG. 4 shows one embodiment of a decoder. The apparatus includes an input buffer 401 that is operable to accept a bitstream encoded by a compression method that includes any of the coding method embodiments described herein.

The output of the buffer acts as input to a codeword recognizer 403 that accepts the bits of the input bitstream and that is operable to determine which of the coding tables the codeword is from. A decoder 405 is coupled to the codeword recognizer 403 and is operable to determine the data for the codeword recognized by the codeword recognizer, including, for any of the position coding methods described herein, a codeword recognizer that can ascertain the position of the nonzero or zero valued coefficients, depending on the position coding used. The codeword recognizer also recognizes other codewords that encode other parameters encoded by the coding method, including the nonzero values, and so forth. In one embodiment, the decoder 405 includes a lookup device that looks up the appropriate decoding table stored in a memory 407. That table provides the event for at least some of the codewords of the set of codewords. Other codewords may include an "escape" code, so that decoding is by other than a table lookup method.

While in the embodiment shown in FIG. 4, the memory is shown separate from the lookup device (decoder) 405, those in the art will understand that in other embodiments, the lookup device 405 includes memory for the tables, and such other embodiments are included herein.

Figure 5:
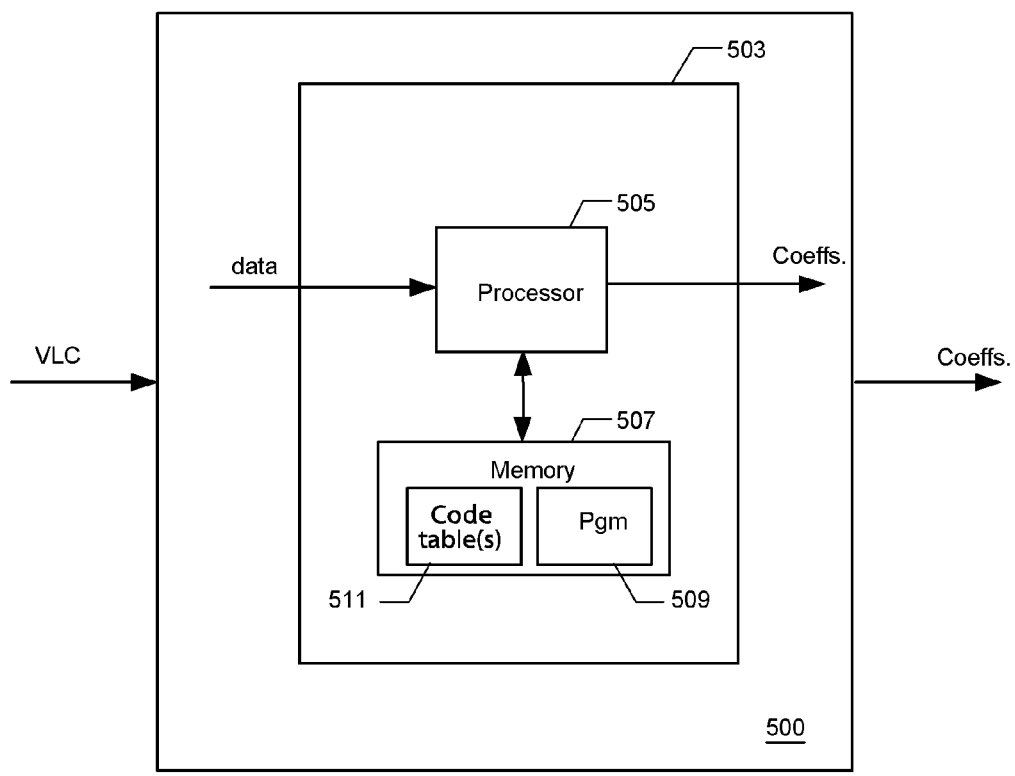
FIG. 5 shows another embodiment that includes an apparatus operable to implement a decoder of a variable length coding method described herein.

FIG. 5 shows another embodiment that includes an apparatus 500 operable to implement a decoder of a variable length coding method described herein. Decoding apparatus 500 includes a processing system 503 that includes one or more processors 505 and a memory 507. A single processor is shown in FIG. 5 and those in the art will appreciate that this may represent several processors. Similarly, a single memory subsystem 507 is shown, and those in the art will appreciate that the memory subsystem may include different elements such as RAM, ROM, and so forth. In addition, the memory subsystem is meant to include any non-volatile memory storage such as a magnetic or optical storage component. A computer program 509 is included and is loaded into the memory 507. Note that at any time, some of the programs may be in the different parts of the memory subsystem, as will be understood by those in the art. The program 509 includes instructions to instruct the processor to implement, in different versions, the recognizing and decoding of codewords. In the embodiment shown, the decoding method uses one or more coding tables 511 in the memory subsystem 507.

Other embodiments include logic encoded in one or more tangible media for execution and when executed operable to carry out any of the coding methods described herein. How to implement such logic would be clear to one in the art from the description herein.

Other embodiments include logic encoded in one or more tangible media for execution and when executed operable to carry out any of the decoding methods described herein. How to implement such logic would be clear to one in the art from the description herein.

Other embodiments include software encoded in one or more computer-readable media and when executed operable to carry out any of the coding methods described herein. How to implement such software would be clear to one in the art from the description herein.

Other embodiments include software encoded in one or more computer-readable media and when executed operable to carry out any of the decoding methods described herein. How to implement such software would be clear to one in the art from the description herein.

Other embodiments include a computer-readable medium having a set of instructions encoded thereon that when executed by one or more processors of a processing system cause carrying out any of the coding methods described herein.

Other embodiments include a computer-readable medium having a set of instructions coded thereon that when executed by one or more processors of a processing system cause carrying out any of the decoding methods described herein.

The term "series" as used herein for the series of quantized coefficients is sometimes referred to as a "block" of coefficients, and also as a "series" of coefficients. Sometimes the term sequence of coefficients is used. Those in the art will understand that such terms may be interchangeably used and the meaning would be clear to those in the art from the context.

Also, in the description, it is assumed that the sequence includes only the AC coefficients and that the DC coefficient of the transform of the block is separately encoded. How to modify the methods described herein to include the DC coefficient would be clear to those in the art.

Furthermore, in the description of example embodiments it was assumed that the quantization of coefficients is such that zero is the most likely to occur amplitude, and 1 is the next most likely to occur amplitude. Of course it is possible to quantize in a manner so that other values or events are used for the most likely-to-occur quantized value or values, and different other values or events are used for the next most likely-to-occur quantized value or values. Those in the art will understand how to modify the particulars described herein to accommodate such variations, and such variations are certainly meant to be within the scope of the present invention.

Furthermore, the invention is not limited to any one type of architecture or type of transform encoding. The transform used in one embodiment is the 8×8 transform defined in the H.264/MEG-4 AVC video coding standard/draft standard for the High Profile. Other embodiments use the transform for the Chinese AVS standard. Other embodiments use a discrete cosine transform (DCT). Other transforms also are possible. Also the block size described herein is 8 by 8, and other block sizes also may be used in alternate embodiments.

The invention does not depend on any particular type of inter-frame coding if used, or of motion compensation if used for inter-frame coding, or any intra-estimation if used for estimating the pixels of a block using information from neighbouring blocks.

Note that variable length coding is sometimes referred to as entropy coding or statistical coding.

Note that the terms coding and encoding are used interchangeably herein.

In some of the embodiments described above, no sign data was included. Most transforms produce positive and negative coefficients, and the forming of the codeword includes an indication of the sign of any nonzero-valued coefficients. In one version, the sign information for any runs of nonzero amplitudes in any region is added together with the information of each amplitude. In an alternate embodiment, the sign information for any runs of nonzero amplitudes in any region may be included in a different manner, e.g., as a code for the series of signs. Other alternate embodiments are also possible for encoding the sign.

Note that in some examples for amplitude encoding, a different number of possible nonzero values can be assumed for the coefficients. The invention however is not restricted to any number of possible quantization values.

Note also that the term amplitude is irrespective of sign. Therefore, for example, coefficient of values +1 and −1 both have amplitude 1.

While one embodiment described herein includes a memory that stores coding tables, other embodiments store the coding information in the form of a data structure other than a table, e.g., a structure that includes a tree. Other data structures may also be used. Similarly, while one embodiment described herein includes a memory that stores a decoding, other embodiments store the decoding information in the form of a data structure other than a table for the decoding.

Note also that the present invention does not depend on the particular type of variable length coding used for any of the coding methods, e.g., the coding tables, and can work, for example, with Huffman coding and with arithmetic coding methods. Furthermore, while embodiments have been described that use fixed encoding for the events based on assumed or a priori likelihoods of occurrence of the events (also called the events), i.e., the likelihoods of occurrence of the events do not change, other embodiments use adaptive encoding, i.e., the encoding is changeable according to statistical data such as histograms collected from the actual coefficients.

Unless specifically stated otherwise, as apparent from the following discussions, it is appreciated that throughout the specification discussions using terms such as "processing," "computing," "calculating," "determining" or the like, refer to the action and/or processes of a computer or computing system, or similar electronic computing device, that manipulate and/or transform data represented as physical quantities, such as electronic, into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Note that when a method is described that includes several elements, e.g., several steps, no ordering of such elements, e.g., steps, is implied, unless specifically stated.

The methodologies described herein are, in one embodiment, performable by one or more processors that accept computer-readable (also called machine-readable) logic encoded on one or more computer-readable media containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including a main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable medium that is encoded with logic (e.g., software) including a set of instructions to cause performing, when executed by one or more processors, one of more of the methods described herein. The software may reside in the hard disk, or may also reside, completely or at least partially, within the RAM and/or within the processor during execution thereof by the computer system. Thus, the memory and the processor also constitute computer-readable medium on which is encoded logic, e.g., in the form of instructions.

Furthermore, a computer-readable medium may form, or be included in a computer program product.

In alternative embodiments, the one or more processors operate as a standalone device or may be connected, e.g., networked to other processor(s), in a networked deployment. The one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the logic including instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable medium having a set of instructions, e.g., a computer program encoded thereon that are for execution on one or more processors, e.g., one or more processors that are part of coder, or a decoder. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable medium encodes logic including a set of instructions that when executed on one or more processors cause implementing a method. Accordingly, aspects of the present invention may take the form of a method, an entirely hardware embodiment, an entirely software embodiment or an embodiment combining software and hardware aspects. Furthermore, the present invention may take the form of a medium (e.g., a computer program product on a computer-readable storage medium) having program code encoded on the medium.

It will be understood that the steps of methods discussed are performed in one embodiment by an appropriate processor (or processors) of a processing (i.e., computer) system executing instructions stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Description of Example Embodiments are hereby expressly incorporated into this Description of Example Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may also be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

What is claimed is:

1. A method of coding using a coding apparatus, the method comprising:
   obtaining an ordered series coefficients associated with a block of image data, the coefficients including a first set of amplitudes and a second set of amplitudes;
   position encoding at least some of the coefficients having amplitudes different from the first set of amplitudes, the position encoding including forming position codewords using a plurality of position code mappings that map position events to position codewords;
   encoding amplitudes of the coefficients that are different from the first set of amplitudes by encoding amplitude events using more than one amplitude code mapping, the encoding of amplitudes being in the reverse order of the original ordering of the series and forming amplitude codewords, wherein amplitude code mapping is at least in part dependent on whether or not the amplitude event includes a coefficient having other than a most likely-to-occur amplitude that is adjacent to at least one coefficient having a most likely-to-occur amplitude; and
   concatenating the position and amplitude codewords.

2. The method of claim 1, wherein the first set of amplitudes includes most likely-to-occur amplitudes.

3. The method of claim 2, wherein 0 is the most-likely-to-occur amplitude and 1 is the next most-likely to occur amplitude.

4. The method of claim 2, wherein one or more position-context parameters of the position context include the maximum run-length of the most likely-to-occur amplitude.

5. The method of claim 2, wherein one or more position-context parameters of the position context include the most recent run-length of the other than the most likely-to-occur amplitude.

6. The method of claim 1, wherein the second set of amplitudes includes at least one next-to-most likely amplitude.

7. The method of claim 1, wherein position encoding includes recognizing and encoding position events to form position codewords.

8. The method of claim 1, wherein position encoding includes switching between the code mappings of the plurality based on a position context.

9. The method of claim 8, wherein the position context is characterized by one or more position-context parameters that are associated with one or more previously encoded position events.

10. The method of claim 1, wherein the position encoding is a one-dimensional position coding method.

11. The method of claim 1, wherein the position encoding is a two-dimensional position coding method.

12. The method of claim 1, wherein the encoding of amplitudes includes switching between the amplitude code mappings based on an amplitude-coding context defined by one or more amplitude-context parameters that, when encoding a current amplitude event, are known or derivable from one or more previously encoded amplitude events.

13. The method of claim 12, wherein the one or more amplitude-context parameters include the maximum previously encoded amplitude.

14. The method of claim 1, wherein the more than one amplitude code mapping include amplitude code mappings that have different dimensionality.

15. The method of claim 1, wherein the encoding of amplitudes includes dividing the amplitude that are other than the most likely-to-occur amplitude into categories including being isolated in that the coefficient having the amplitude is preceded and followed by coefficients that have the most likely-to-occur amplitude, being adjacent in that the coefficient having the amplitude is wither preceded or followed by a coefficient that has the most likely-to-occur amplitude, but not both, and on whether the coefficient having the amplitude is neither isolated nor adjacent.

16. The method of claim 1, wherein concatenating is performed such that sequences of quantized coefficients that are more likely-to-occur are more frequently encoded by shorter sets of codewords than sequences of quantized coefficients that are less likely-to-occur.

17. A non-transitory computer-readable storage medium encoded with computer-executable instructions that when executed by one or more processors of a processing system implement a method comprising:
   obtaining an ordered series coefficients associated with a block of image data, the coefficients including a first set of amplitudes and a second set of amplitudes;
   position encoding at least some of the coefficients having amplitudes different from the first set of amplitudes, the position encoding including forming position codewords using a plurality of position code mappings that map position events to position codewords;
   encoding amplitudes of the coefficients that are different from the first set of amplitudes by encoding amplitude events using more than one amplitude code mapping, the encoding of amplitudes being in the reverse order of the original ordering of the series and forming amplitude codewords, wherein amplitude code mapping is at least in part dependent on whether or not the amplitude event includes a coefficient having other than a most likely-to-occur amplitude that is adjacent to at least one coefficient having a most likely-to-occur amplitude; and
   concatenating the position and amplitude codewords.

18. An apparatus comprising:
a processor;
a non-transitory memory including instructions that when executed by the processor cause the apparatus to:
   obtain an ordered series coefficients associated with a block of image data, the coefficients including a first set of amplitudes and a second set of amplitudes;
   position encode at least some of the coefficients having amplitudes different from the first set of amplitudes, the position encoding including forming position codewords using a plurality of position code mappings that map position events to position codewords;
   encode amplitudes of the coefficients that are different from the first set of amplitudes by encoding amplitude events using more than one amplitude code mapping, the encoding of amplitudes being in the reverse order of the original ordering of the series and forming amplitude codewords, wherein amplitude code mapping is at least in part dependent on whether or not the amplitude event includes a coefficient having other than a most likely-to-occur amplitude that is adjacent to at least one coefficient having a most likely-to-occur amplitude; and
   concatenate the position and amplitude codewords.

\* \* \* \* \*